United States Patent
Engler

[15] 3,670,508
[45] June 20, 1972

[54] GATE PLACER FOR LEVEE
[72] Inventor: Louis C. Engler, Heber Springs, Ark. 72543
[22] Filed: Nov. 16, 1970
[21] Appl. No.: 89,981

[52] U.S. Cl. .................................. 61/63, 37/1, 37/103, 37/118 R, 61/12, 61/29, 61/30, 175/19
[51] Int. Cl. .................................. E02b 7/20, E02f 5/16
[58] Field of Search .................................. 37/103, 80, 1, 118; 175/19–23; 61/63

[56] References Cited
UNITED STATES PATENTS
3,182,459  5/1965  Grether et al. ............................. 61/63
3,343,614  9/1967  Parisien ................................... 175/19

Primary Examiner—Robert E. Pulfrey
Assistant Examiner—Clifford D. Crowder
Attorney—John R. Walker, III

[57] ABSTRACT

Apparatus adapted to be used with a tractor in conjunction with irrigation levees, for making an opening in the levee and subsequently placing a gate therein. The apparatus includes a pair of scoops movably mounted from a frame for transverse movement towards and away from each other. There is a device provided for urging the scoops downwardly into the dirt. Also, structure is provided for urging the scoops apart to spread the dirt to provide the opening in the levee. A gate handling device is provided for releasably holding a levee gate and for urging the gate into the opening in the levee formed by the scoops.

14 Claims, 7 Drawing Figures

INVENTOR.
LOUIS C. ENGLER
BY John R. Walker, III
Attorney

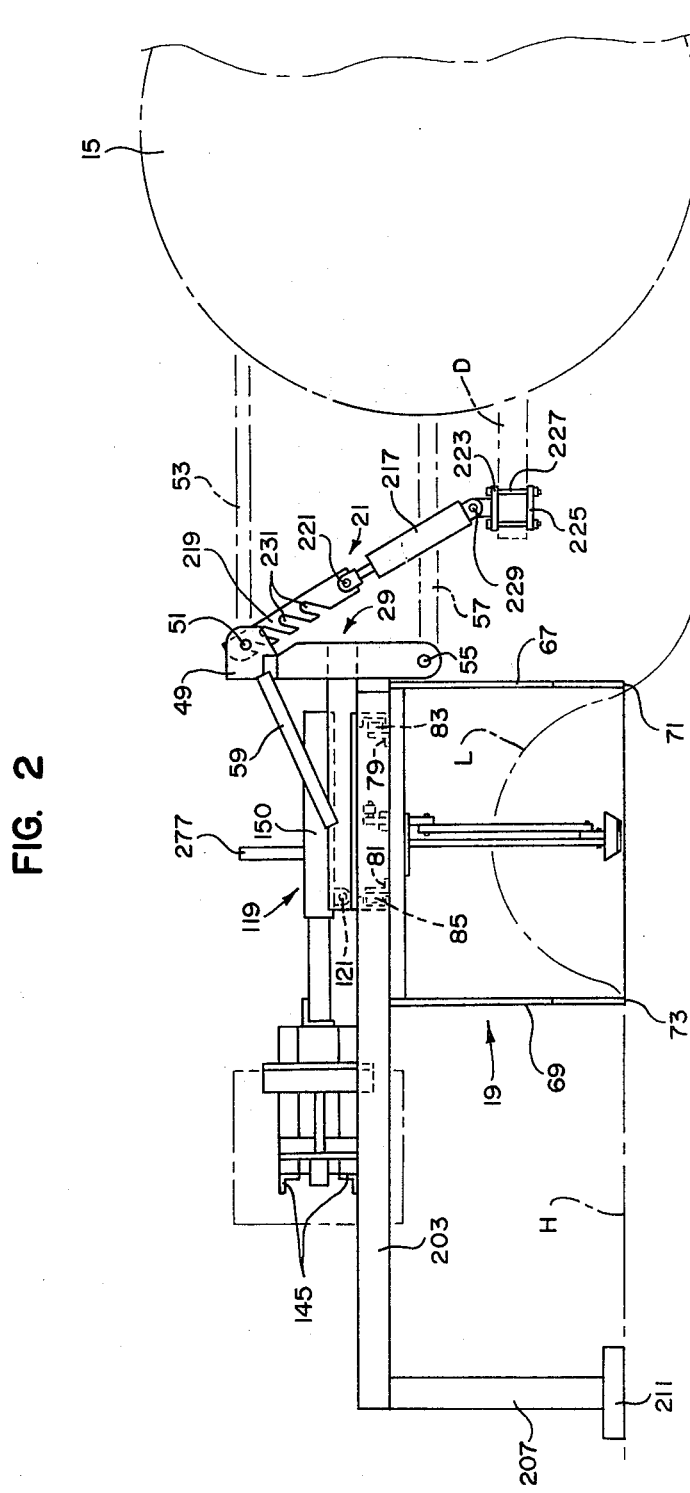

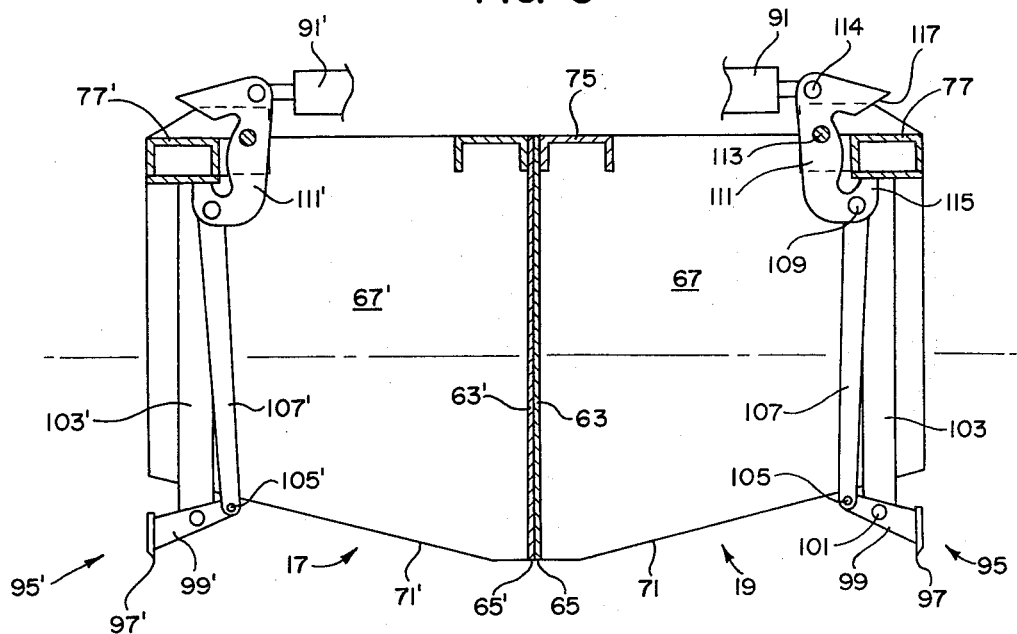
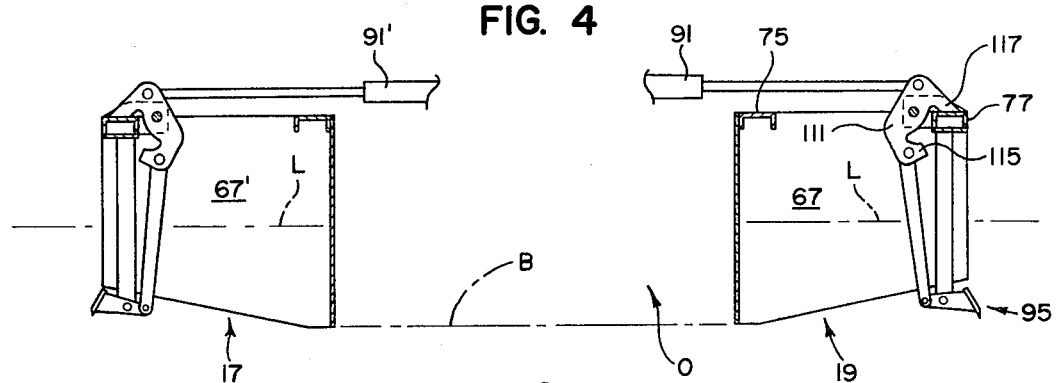
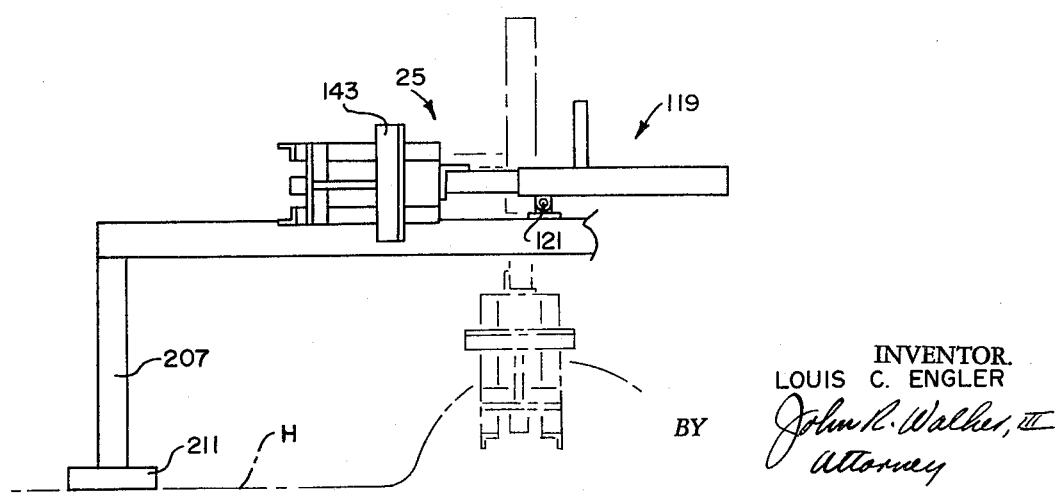

INVENTOR.
LOUIS C. ENGLER

BY John R. Walker, II
Attorney

GATE PLACER FOR LEVEE

BACKGROUND OF THE INVENTION

1. Field of the Invention

This invention relates to tractor mounted apparatus for making an opening in an irrigation levee and for placing a gate therein.

2. Description of the Prior Art

A preliminary patentability search revealed the following references: U.S. Pat. Nos. 3,182,459; 1,589,249; 2,535,054; 2,901,215; and 2,915,282.

The '459 reference shows a device designed to mount a water barrier in the ground, and the other references show various devices to push articles into the earth and which may be tractor mounted. However, none of the references disclose or suggest a tractor-mounted apparatus for making an opening in an irrigation levee and for placing a gate therein.

SUMMARY OF THE INVENTION

The present invention is directed towards providing apparatus for making a smooth level opening in an irrigation levee and for providing in such apparatus, gate handling means for holding a levee gate and for urging the gate into the opening in the levee.

It is an object of the present invention to provide such an apparatus which automatically gages the proper depth of the opening in the levee so that it will be at the same level as the high side of the levee.

A further object is to provide means for engaging the ground to maintain the scoops substantially level during the movement thereof from the retracted disposition to the extended disposition.

A further object is to provide means or transferring the weight of the tractor onto the scoops to cause the scoops, when in a retracted position, to move downwardly into the dirt of the levee.

A further object is to provide such gate handling means whereby a gate may be releasably placed thereon ans subsequently the gate handling means actuated by the operator of the tractor to urge the gate into the opening in the levee formed by the scoops.

A further object is to provide such an apparatus that is adapted to be used with a tractor and which comprises frame means for attachment rearwardly of the tractor, a pair of scoops respectively having blades, means movably mounting the scoops on the frame means for relative movement between a retracted disposition in which the scoops are adjacent one another and an extended disposition in which the scoops are spaced substantially apart, means for moving the frame means downwardly when the scoops are disposed in the retracted disposition to carry the scoops downwardly into the dirt of the levee, and means for relatively moving the scoops from said retracted disposition to said extended disposition to push the dirt of the levee apart and leave an opening therethrough.

BRIEF DESCRIPTION OF THE DRAWING

FIG. 2 is a side elevational view thereof.

FIG. 3 is a transverse sectional view of the scoops of the present invention shown in the retracted disposition.

FIG. 4 is a similar view to FIG. 3 but showing the scoops in an extended disposition.

FIG. 5 is a view of a portion of that shown in FIG. 2 illustrating the gate handling means in solid lines in a normal position and in broken lines in a vertical gate placing position.

DESCRIPTION OF THE PREFERRED EMBODIMENT

Figure 1:
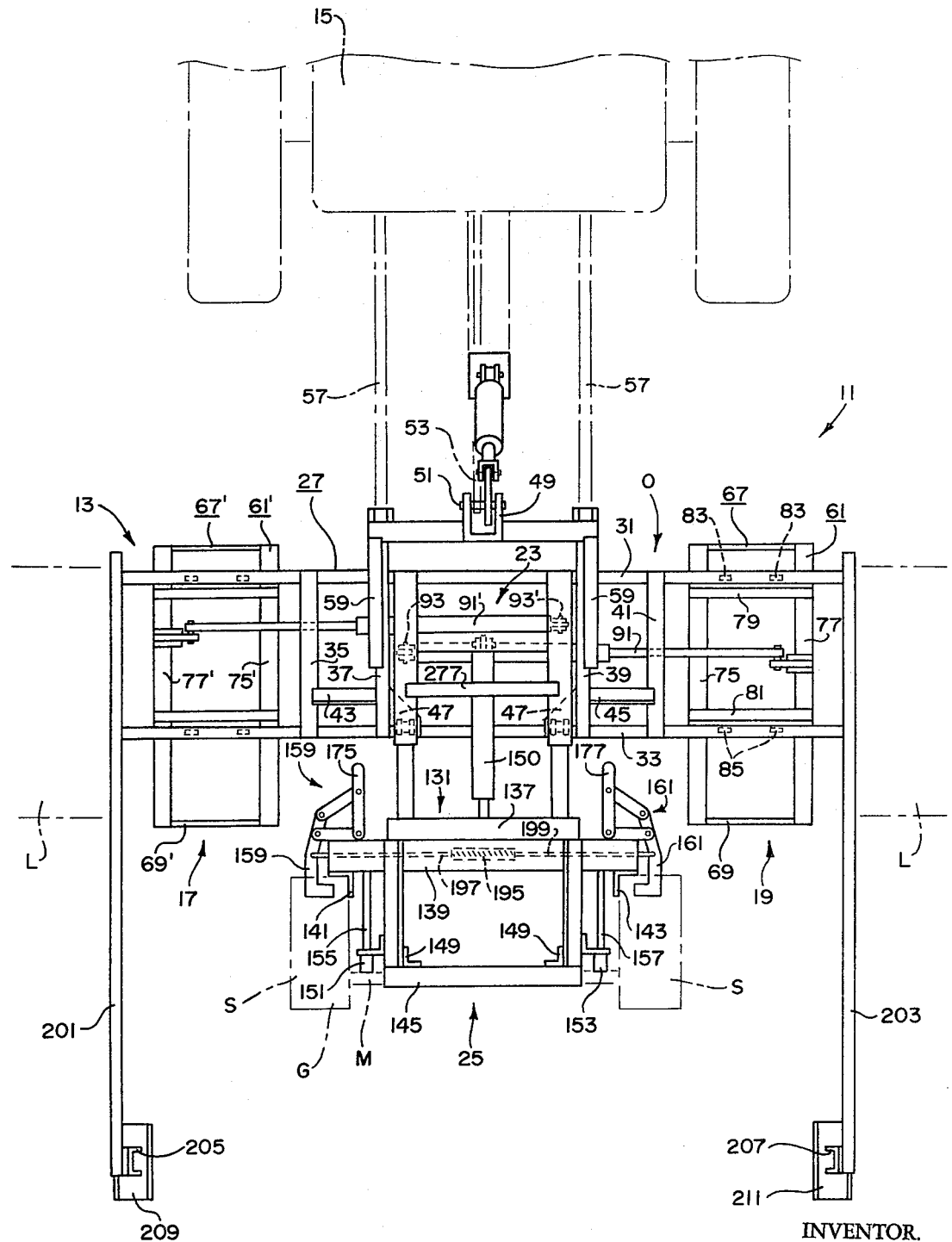
FIG. 1 is a top plan view of the apparatus of the present invention shown mounted on a tractor and with only a portion of the tractor being shown in phantom lines.

The apparatus 11 of the present invention comprises in general a frame 13 for attachment rearwardly of a tractor, as tractor 15, shown in FIGS. 1 and 2, a pair of scoops 17, 19 mounted for relative movement between a retracted disposition shown in FIG. 3 and an extended disposition shown in FIG. 4, an assembly 21 interposed between tractor 15 and frame 13 for moving the frame downwardly when the scoops 17, 19 are disposed in the retracted disposition to carry the scoops downwardly into the dirt of the levee L, power means 23 for moving scoops 19, 21 from the retracted disposition to the extended disposition to push the dirt of the levee apart and leave an opening O therethrough, and a gate handling assembly 25 for holding a gate G and for urging gate G into the opening of the levee L formed by the scoops 17, 19.

Referring now in more detail to apparatus 11, frame 13 comprises in general a horizontal portion 27 of open framework construction and a vertical portion 29 rigidly attached intermediate the ends of the horizontal portion adjacent the forward part thereof to provide the means for attaching the frame 13 to the tractor 15. Horizontal portion 27 includes forward and rearward transverse members 31, 33 rigidly interconnected by parallel spaced apart members 35, 37, 39, 41 extending perpendicularly relative to transverse members 31, 33. In addition, horizontal portion 27 preferably includes reinforcing members 43, 45 and gussets 47. Vertical portion 29 is preferably in the form of an A-frame and includes a bifurcated portion 49 at the upper end thereof with a pin 51 spanning the bifurcated portion and adapted to pivotally receive the upper rod portion 53 of the conventional three-point hitch of the tractor 15. In addition, the vertical portion includes a pair of outwardly extending pins 55 at the lower part thereof adapted to pivotally receive the usual lift arms 57 of the tractor 15. A pair of diagonal members 59 preferably extend between vertical portion 29 and horizontal portion 27 for adding rigidity to the vertical portion 29.

Scoops 17, 19 are substantially identical with the exception that one is of right-hand construction and the other of left-hand construction so that the following description of scoop 19 should suffice for both. Also, it should be pointed out that the parts of the scoop 17 corresponding to scoop 19 have been designated with the same numerals having the prime mark added thereto.

Scoop 19 comprises a framework 61 having attached thereto a vertical planar blade portion 63 which extends in a fore and aft direction and has a lower edge 65. In addition, scoop 19 includes vertical forward and rearward planar sides 67, 69 which are in spaced parallel relationship. The sides 67, 69 are respectively integrally attached to vertical blade 63 respectively at the forward and rearward edges thereof and extend perpendicularly outwardly from the vertical blade 63. The lower edges 71, 73 respectively of sides 67, 69 are preferably extended slightly angularly upwardly and outwardly from vertical blade 63. Framework 61 is of any suitable construction and includes parallel and longitudinal members 75, 77, and transverse members 79, 81 rigidly attached thereto by suitable means, as welding. Scoop 19 is movably mounted from frame 13 as by means of slide blocks 83, 85 which are respectively mounted on members 79, 81. The slide blocks 83, 85 respectively slidably engage the transverse members 31, 33. A similar means is provided for movably supporting scoop 17 from frame 13. A piston-cylinder assembly 91 is pivotally attached at its inner end, as at 93, to frame 13 and extends outwardly transversely of apparatus 11 to its attachment to scoop 19, which attachment will be described hereinafter. A similar piston-cylinder assembly 91' is provided for scoop 17. Piston-cylinder -cylinder assemblies 91, 91' furnish the means whereby the scoops 17, 19 may be moved between a retracted disposition as shown in FIG. 3, in which the vertical blades 63, 63' of the scoops 19, 17 are adjacent one another, to an extended disposition as shown in FIG. 4 in which the scoops are spaced substantially apart. The hydraulic arrangement for piston-cylinder assemblies 91, 91' will be described more in detail later in the specification.

Means are provided on scoops 17, 19 for maintaining the scoops substantially level during the movement thereof from said retracted disposition to said extended disposition. Since both of the above-mentioned means are substantially identical, the following description of that on scoop 19 should suffice for both and like numerals are used for corresponding parts on the two scoops with the prime mark being used for the parts on scoop 17. Thus, the above-mentioned means on scoop 19 includes a plow blade 95 having a sharpened lower edge 97. Plow blade 95 is fixedly mounted on the end of an arm 99, which arm is pivotally mounted by suitable means as at pivot point 101 from a strut 103 for pivot of the arm about a horizontal axis extending fore and aft relative to the apparatus 11. Strut 103 forms a part of framework 61 and is fixedly attached to member 77, from which it depends. The other end of arm 99 remote from blade 95 is pivotally attached by suitable means as at 105 to a link 107 which in turn is pivotally attached by suitable means as at 109 to a rocker stop means 111, which in turn is rockably mounted from framework 61 by suitable means as at 113. The rod end or outer end of piston-cylinder assembly 91 is pivotally attached by suitable means as at 114 to rocker stop means 111 above pivot 113. Rocker stop means 111 is substantially C-shaped and includes a first stop 115 adapted to engage the lower face of member 77 to limit counterclockwise movement of rocker stop means 111 and stop it in a first position when piston-cylinder assembly 91 is retracted, as shown in FIG. 3. When rocker stop means 111 is in said first position, the plow blade 95 will be disposed in a substantially vertical position as shown in FIG. 3 with the plane thereof extending substantially fore and aft. Also, rocker stop means 111 is provided with a second stop 117 for engaging the top of member 77 and limit clock-wise movement of rocker stop means 111 in which it is stopped in a a second position shown in FIG. 4. When rocker stop means 111 is in said second position, plow blade 95 is positioned by link 107 in an angled disposition, as shown in FIG. 4 wherein the plow blade 95 is angled outwardly and downwardly.

Figure 6:
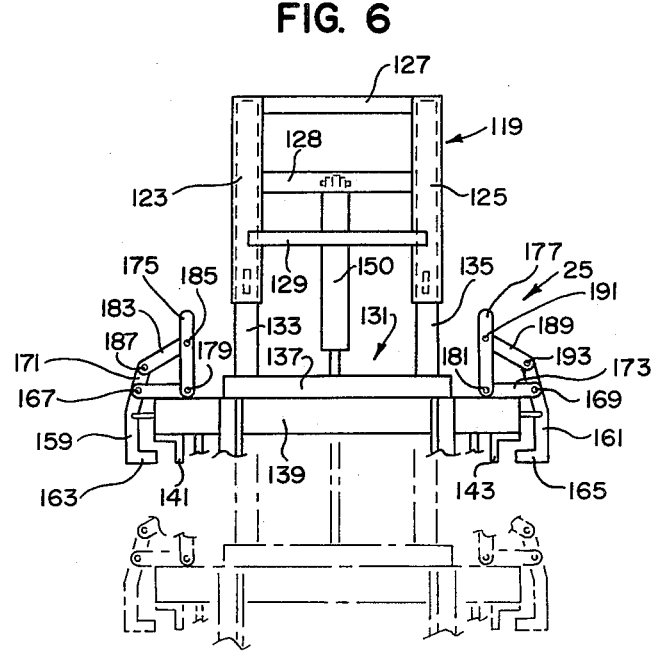
FIG. 6 is an end elevational view of the gate handling means shown in solid lines in the normal position and in broken lines in the gate placing disposition.

Gate handling assembly 25 includes a sub-frame 119 pivotally mounted on top of frame 13 by suitable pivot means as at 121 for pivot of the sub-frame and gate handling assembly between a horizontal disposition as shown in FIGS. 2 and 5, and a vertical disposition shown in FIG. 6 and in broken lines in FIG. 5. Sub-frame 119 includes a pair of parallel cylindrical members 123, 125 that are rigidly interconnected by cross members 127, and 128, and a handle 129. A carriage 131 for handling a gate G, shown in broken lines in FIG. 1 is movably mounted from sub-frame 119 for movement, when sub-frame 119 is in said vertical position, between and upper position shown in solid lines in FIG. 6 and a downward position shown in broken lines in FIG. 6 to carry the gate G downwardly into engagement with the ground. Carriage 131 includes a pair of piston members 133, 135 respectively telescopically slidably received in cylindrical members 123, 125. In addition, carriage 131 includes a transverse members 137 rigidly interconnecting the lower ends of piston members 133, 135, a beam 139 fixedly attached, as by welding or the like, to transverse member 137, and a pair of outer angle members 141, 143 respectively fixedly attached to the outer ends of beam 139 and adapted to engage the upper edges of the respective side members S of gate G. Also, carriage 131 includes a pair of parallel and transverse angle members 145, 147 which are supported in substantially parallel spaced apart relationship below beam 139 as by means of the members 149 which are rigidly interconnected thereto by suitable means as welding or the like. Transverse angle members 145, are respectively adapted to receive the mid-portion M of gate G therebetween and engage the upper edges of the mid-portion to aid in urging the gate G into the ground along with the outer angle members 141, 143. A piston-cylinder assembly 150 is interconnected between members 128 and 137 for moving carriage 131 between said upper and downward positions.

Means are provided for releasably holding the gate G onto the carriage 131, which includes a pair of magnets 151, 153 for engaging the metal gate G and for holding it against the angle members 141, 143, 145 and 147, and which magnets 151, 153 are supported by supports 155, 157 attached to beam 139 at one end and to the magnets at the other. Additionally, holding means are provided at the opposite ends of beam 139 and which includes holding members 159, 161 respectively having portions 163,165 for engaging the sides S of gate G. Holding members 159, 161 are pivotally attached to beam 139 by suitable means as at 167, 169 respectively to the members 171, 173 which in turn are fixedly attached to beam 139. Upstanding handles 175, 177 are pivotally attached by suitable means as at 179, 181 to the inner ends of members 171, 173. A link 183 is pivotally attached as at 185 to handle 175 and as pivotally attached as at 187 to the upper end of member 163. Likewise, a link 189 is pivotally attached as at 191 to handle 177 and is pivotally attached to the upper end of member 165 as at 193. A tension spring 195 (see FIG. 1) is connected at one end to member 159 and at the other end to member 161 as by the elongated members 197, 199 to urge the lower ends of the holding members 159, 161 inwardly towards one another to engage the sides S of the gate G. It will be understood that the upper ends of the handles 175, 177 may be pulled inwardly towards one another to cause the lower ends of holding members 159, 161 to move outwardly against the spring 195 so that the gate G can be put into place on the carriage 131. It will be understood that both the holding means, that is, the magnets 151, 153 and holding members 159, 161, may be utilized, or if desired, either one or the other may be omitted.

Stop means are provided for engaging the ground to limit downward movement of frame 13 and scoops 17, 19, and which stop means preferably includes a pair of parallel members 201, 203 fixedly attached to the opposite ends of transverse members 31, 33 and extending rearwardly therefrom, a pair of depending members 205, 207 respectively fixedly attached to members 201, 203 and extending downwardly therefrom, and a pair of substantially horizontal foot portions 209, 211 respectively fixedly attached to the lower ends of depending members 205, 207 for engaging the ground. The lower surfaces respectively of foot portions 209, 211 are disposed at the same horizontal level as the lower edges 65, 65', of the vertical blades 63, 63' of scoops 17, 19, and at the same level as the edges 97, 97' of plow blades 95 when the plow blades are in a vertical position. The lower surfaces of foot portions 209, 211 being at the same level as the lower edges 65, 65' of the vertical blades 63, 63' limit the depth of penetration of vertical blades 63, 63', into the ground so that the bottom B of the opening in the levee L formed by the scoops 17, 19 will be at the same level with ground level 13 on the high side of the levee, as will be better understood in the description of the operation of apparatus 11 to follow later in the specification.

Ratchet assembly 21 provides means for urging scoops 17, 19 into the dirt of the levee L and includes a piston-cylinder assembly 217 and a ratchet bar 219 fixedly attached by suitable means as at 221 to the rod end of piston-cylinder assembly 217. The base end of piston-cylinder assembly 217 is pivotally attached to the drawbar D of tractor 15 as by means of a suitable clamp including the plates 223, 225, bolts 227 and a suitable pivot connection 229 between plate 223 and piston-cylinder assembly 217. The ratchet bar 219 has a plurality of downwardly angled slots 231 in the lower edge of ratchet bar 219 and spaced along the length thereof for selective engagement of one of the slots with pin 51. It will be understood that by retracting piston-cylinder assembly 217, the weight of the tractor 15 is placed onto frame 13 and scoops 17, 19 to urge the scoops downwardly into the earth.

Figure 7:
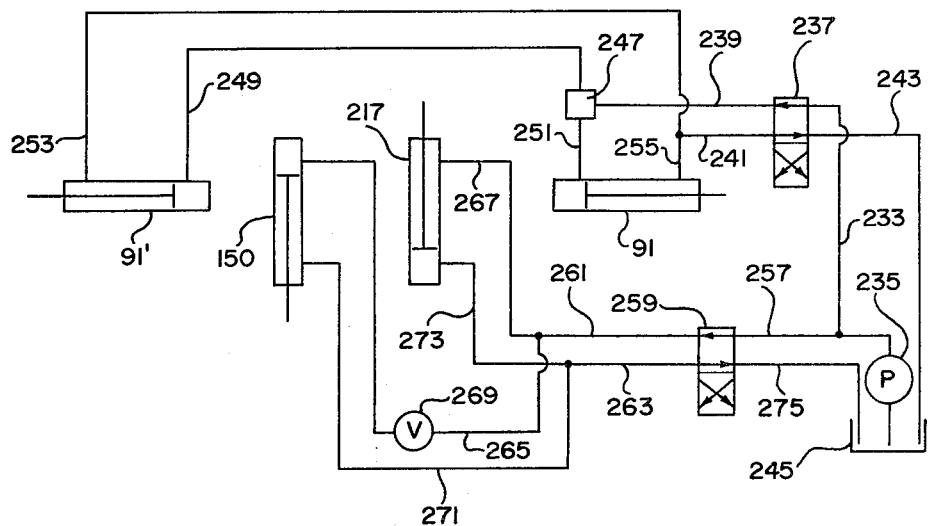
FIG. 7 is a diagrammatic view of the hydraulic system of the present invention.

Suitable hydraulic means is provided for actuating the cylinders 91, 91', 150, and 217, and is preferably as shown in FIG. 7. In FIG. 7 it will be seen that for the cylinders 91, 91' there is provided a conduit 233 leading from a suitable source of hydraulic fluid as a pump 235 to a suitable valve 237 which selectively directs the flow through conduit 239 or 241 with the fluid being returned from the conduit 239, 241 not selected and through the valve 237 to return conduit 243 and to the reservoir 245. Conduit 239 leads to a flow divider 247 where the flow is divided into the conduits 249 and 251 which lead respectively to the piston end of the piston-cylinder assemblies 91, 91' so that when the flow is through the conduits 249, 251, the scoops are urged outwardly by the piston-cylinder assemblies 91, 91' being extended. In this case, the flow from the rod end of the piston-cylinder assemblies 91, 91' is returned through the conduits 253 and 255 to the conduit 241. It will be understood to retract the scoops 17, 19 valve 237 is shifted into the other position not shown in which the flow is to the piston-cylinder assemblies 91, 91' through the conduits 241, 253, 255, and the fluid is returned through the conduits 249, 251, 239.

For the actuation of the piston-cylinder assemblies 217, 150, a suitable source of hydraulic fluid under pressure is provided by pump 235 through the conduit 257 to the valve 259 which selectively directs the flow to conduit 261 or 263. Conduit 261 leads to the piston end of piston-cylinder assembly 150, and the rod end of piston-cylinder assembly 217 through the conduits 265, 267 to extend the piston-cylinder assembly 150 and retract the piston-cylinder assembly 217. A cutoff valve 269 is provided in conduit 265 for a purpose later to be described. The return of the hydraulic fluid when valve 259 is in the position just described, will be from the conduits 271, 273 to the conduit 263, through the valve 259 and to the reservoir 245 through the conduit 275. When the valve 259 is in the other position, it will be understood that the flow will be to the rod end of the piston-cylinder assembly 150 and to the base end of piston-cylinder assembly 217 to cause retraction of the piston-cylinder assembly 150 and to extend piston-cylinder assembly 217. The valves 237, 259 and 269, as well as the pump 235 and reservoir 245 are preferably disposed in a suitable position for actuation by the operator of the tractor 15.

In the operation of the apparatus 11 it is assumed that the levee L has been built and it is desired to make an opening O therein. Initially, the gate handling assembly 25 is in said horizontal disposition with piston-cylinder assembly 150 being retracted and piston-cylinder assembly 217 being extended. The piston-cylinder assemblies 91, 91' are retracted so that the scoops 17, 19 are in a retracted disposition as shown in FIG. 3. Next, the tractor 15 is positioned so that the levee L extends transversely behind the tractor with the wheels of the tractor being on the low side of the levee, the scoops 17, 19 straddling the levee (that is, with the sides 67, 67' being on one side of the levee and the sides 69, 69' being on the other side) and blade 63, 63' extending across the levee. Also, it will be understood that with the tractor 15 in the above-described position, the foot portions 209, 211 will be disposed above the ground of the high side H of the levee. Next, the ratchet bar 219 is placed on pin 51 with one of the slots 231 receiving the pin 51. With valve 269 being closed, the valve 259 is actuated to cause the piston-cylinder assembly 217 to retract and pull the scoops 17, 19 down into the dirt of the levee L until the lower surfaces of foot portions 209, 211 engage the ground H to limit the depth of the cut, which will be at the same level as the ground H. During this movement the plow blades 95, 95' are disposed in a vertical position so that they can easily be urged into the levee. When the above mentioned level is reached, the scoops 17, 19 are then moved to an extended disposition to spread the dirt of the levee in opposite directions to provide the opening O in the levee. In said extended position the distance between scoops 17, 19 is slightly greater than the width of gate G so that the gate will fit in opening O. It will be understood that as the scoops 17, 19 move to said extended disposition, the plow blades 95, 97 which angle outwardly and downwardly will keep the scoops level. This is somewhat of a camming action that the dirt exerts against the angled blades 95, 95' which in turn causes the blades 95, 95' to exert a downward force on the outward ends of the scoops 17, 19 and overcome the tendency of the scoops to turn upwardly or ride upwardly at the outer ends, thus preventing a dished cut-out.

After the opening O has been made as above-described, the gate G is placed on the gate handling assembly 25. The gate handling assembly 25 is manually rotated as by means of handle 129 attached to sub-frame 119, from the heretofore-mentioned horizontal to the vertical position at this time. Valve 269 is opened and the valve 259 is then moved to a position to extend the piston-cylinder assembly 150 which causes the gate G to be pressed into the dirt which forms the bottom of the opening O until the top surface of the mid-portion M of the gate is level with ground H. It will be understood that while piston-cylinder assembly 150 is being extended piston-cylinder assembly 217 it being retracted to cause the weight of the tractor 15 to be transferred to gate G and aid in urging the gate G into the dirt. After the gate G has been placed in the ground, as above-described, valve 259 is moved to cause piston-cylinder assembly 150 to retract and piston-cylinder assembly 217 to extend. Then, the gate handling assembly 25 is rotated to a horizontal position. Finally, the frame 13 is then lifted by the three point-hitch of the tractor 15, which includes arms 57, acting through the vertical portion 29, and the tractor 15 is driven off to the next position for installing another gate.

Although the invention has been described and illustrated with respect to a preferred embodiment thereof, it is to be understood that it is not to be so limited since changes and modifications may be made therein which are within the full intended scope of this invention.

I claim:

1: Apparatus adapted to be used with a tractor in conjunction with an irrigation levee comprising frame means for attachment rearwardly of the tractor, a pair of scoops respectively having blades, means movably mounting said scoops on said frame means for relative movement between a retracted disposition in which said scoops are adjacent one another and an extended disposition in which said scoops are spaced substantially apart, means for moving said frame means downwardly when said scoops are disposed in said retracted disposition to carry said scoops downwardly into the dirt of the levee, and means for moving said scoops from said retracted disposition to said extended disposition to push the dirt of the levee apart and leave an opening therethrough.

2: The apparatus of claim 1 which includes gate handling means attached to said frame means for holding a gate and for urging the gate into the opening in the levee formed by said scoops.

3: The apparatus of claim 2 in which said gate handling means includes a sub-frame pivotally mounted on said frame for pivot between a horizontal disposition and a vertical disposition, carriage means for receiving and holding a gate, piston-cylinder means interposed between said carriage means and said sub-frame for moving said carriage means downwardly when said sub-frame is in said vertical disposition to carry the gate downwardly into engagement with the ground.

4: The apparatus of claim 1 which includes stop means attached to said frame means for engaging the ground to limit downward movement of said frame means.

5: The apparatus of claim 1 which includes a pair of plow means respectively mounted on said scoops for engaging the ground to maintain said scoops substantially level during the movement thereof from said retracted disposition to said extended disposition.

6: The apparatus of claim 5 in which each of said plow means includes a plow blade, means pivotally mounting said plow blade for movement between a vertical disposition and an angled disposition in which said plow blade is angled outwardly and downwardly, and actuating means operably coupled to said means pivotally mounting said plow blade for moving said plow blade from said vertical disposition when said scoops are in said retracted disposition to said angled disposition when said scoops are moved from said retracted disposition to said extended disposition.

7: In an apparatus adapted to be used with a tractor in conjunction with an irrigation levee, frame means for attachment rearwardly of the tractor, a pair of scoops respectively having outer ends and inner ends, means movably mounting said scoops on said frame means for relative movement between a retracted disposition in which said scoops are adjacent one another and an extended disposition in which said scoops are spaced substantially apart, said scoops respectively including vertical blade portions and forward and rearward sides extending outwardly in spaced apart relationship respectively from said vertical blade portions, said scoops being arranged with the respective blade portions thereof adjacent one another and said forward and rearward sides of one of said scoops extending laterally in one direction away from said blade portion of said one of said scoops and said forward and rearward sides of the other of said scoops extending laterally in the opposite direction away from said blade portion of said other of said scoops, a pair of plow blades, a pair of arm means respectively pivotally mounting said plow blades from said scoops adjacent said outer ends thereof at substantially the same level as the lower edges of said blade portions for movement of each of said plow blades between a vertical disposition and angled disposition in which said plow blade is angled outwardly and downwardly, a pair of rocker stop means respectively pivotally mounted on said scoops adjacent the outer ends thereof and above said plow blades, said stop means respectively having first stops for engaging said scoops to limit pivot of said rocker stop means in one direction in which said rocker stop means are in first positions and having second stops for engaging said scoops to limit pivot of said rocker stop means in the opposite direction in which said rocker stop means are in second positions, a pair of piston-cylinder assembly means respectively interposed between said frame means and said rocker stop means for movement towards retracted dispositions in which said rocker stop means are pulled thereby into said first positions and said scoops are in turn pulled toward said retracted disposition and for movement towards extended dispositions in which said rocker stop means are pushed thereby into said second positions and said scoops are in turn pushed toward said extended disposition to push the dirt of the levee apart and leave an opening therethrough and a pair of link means respectively interconnecting said rocker stop means and said pair of arm means for movement of said plow blades into said vertical dispositions in response to movement of said rocker stop means in said first positions and for movement of said plow blades into said angled dispositions in response to movement of said rocker stop means in said second positions.

8: The apparatus of claim 7 which includes means for moving said frame means downwardly when said scoops are in said retracted disposition to carry said scoops downwardly into the dirt of the levee.

9: The apparatus of claim 8 in which said frame means includes a three point attachment frame for attachment to the tractor, in which said attachment frame includes an upper transverse pin, and in which said means for moving said frame means downwardly includes a ratchet bar provided with a plurality of slots for selectively engaging said pin and includes a piston-cylinder means interposed between said ratchet bar and the tractor for pulling said ratchet bar downwardly.

10: The apparatus of claim 8 which includes gate handling means attached to said frame means for holding a gate and for urging the gate into the opening in the levee formed by said scoops.

11: The apparatus of claim 10 in which said gate handling means includes magnet means for releasably holding the gate.

12: The apparatus of claim 10 in which said gate handling means includes clamping means for releasably clamping the gate.

13: The apparatus of claim 10 in which said gate handling means includes a sub-frame pivotally mounted on said frame for pivot between a horizontal disposition and a vertical disposition, carriage means for receiving and holding a gate, piston-cylinder means interposed between said carriage and said sub-frame for moving said carriage means downwardly when said sub-frame is in said vertical disposition to carry the gate downwardly into engagement with the ground.

14: The apparatus of claim 13 which includes stop means attached to said frame means for engaging the ground to limit downward movement of said frame means.

* * * * *